Sept. 20, 1966     C. L. LOVERCHECK     3,273,261
ANATOMICAL DEVICE
Filed April 3, 1964                       2 Sheets-Sheet 1
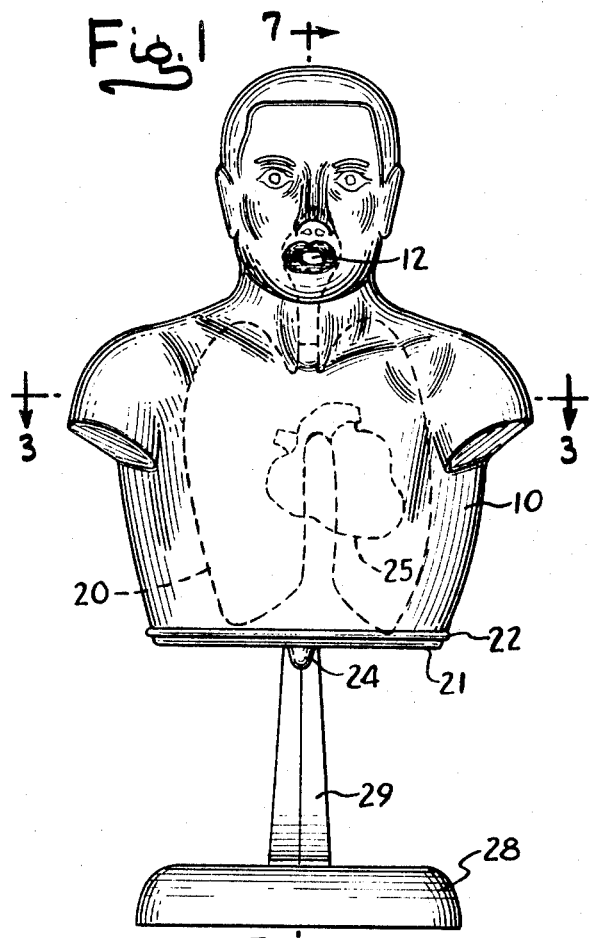
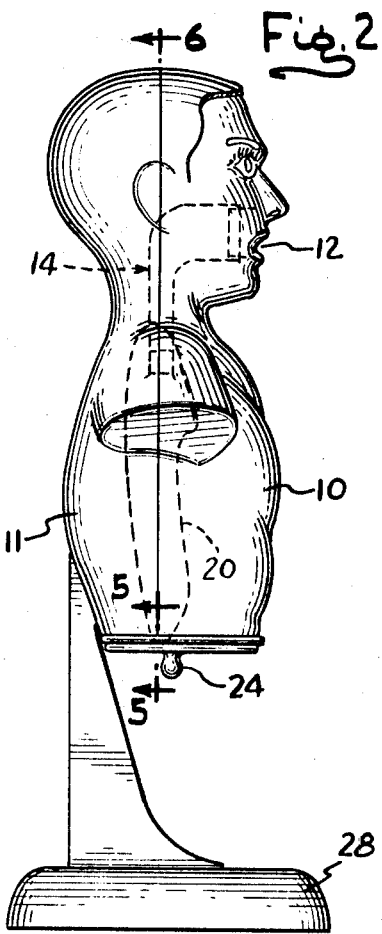
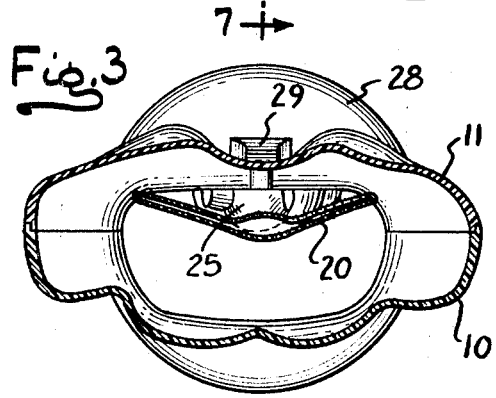
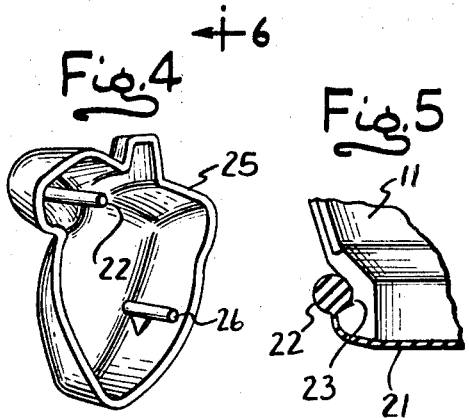
INVENTOR
CORRIE L. LOVERCHECK
by: Gary, Parker, Juettner & Cullinan
ATTYS.

Sept. 20, 1966     C. L. LOVERCHECK     3,273,261
ANATOMICAL DEVICE
Filed April 3, 1964                                    2 Sheets-Sheet 2
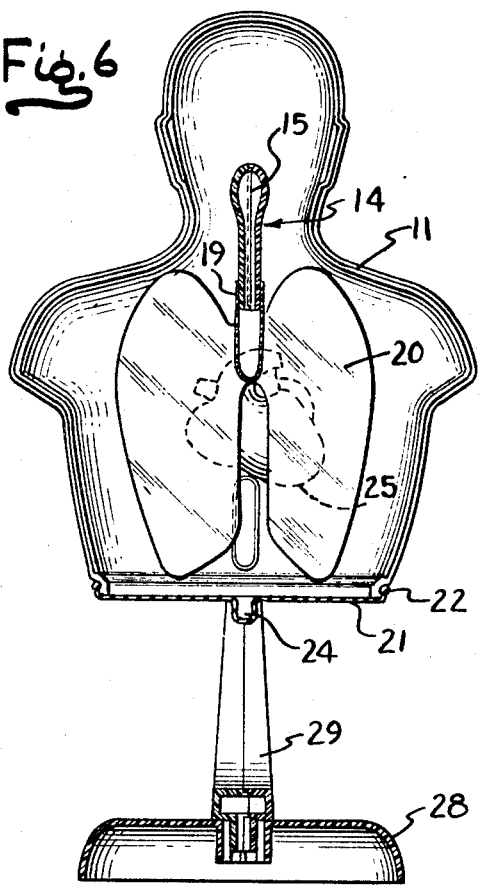
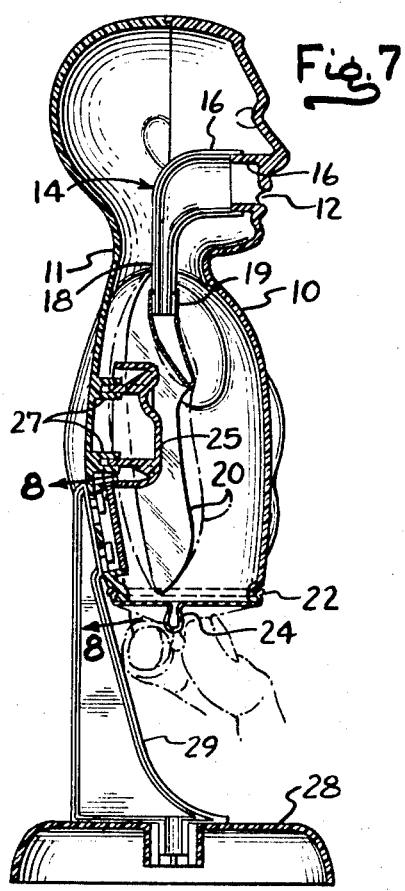
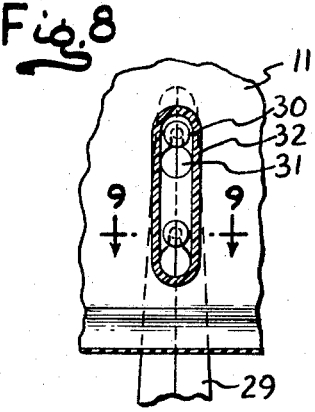
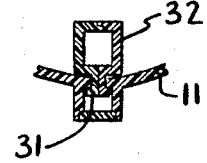
INVENTOR
CORRIE L. LOVERCHECK
by: *Darby, Parker, Juettner & Cullinan*
ATTYS.

United States Patent Office 3,273,261
Patented Sept. 20, 1966

3,273,261
ANATOMICAL DEVICE
Corrie L. Lovercheck, Deaver Wyo., assignor, by mesne assignments, to Ideal School Supply Company, Oak Lawn, Ill., a corporation of Illinois
Filed Apr. 3, 1964, Ser. No. 357,032
5 Claims. (Cl. 35—17)

This invention relates to a novel anatomical device particulating adapted to simulate the human lungs or breathing system.

More particularly, the present invention relates to an anatomical device which may be composed of a plurality of parts adapted to be assembled to form a simulated human head and torso or chest with associated means adapted to simulate breathing. The component parts are adapted for quick assembly and for use by students of anatomy, science, medicine, modeling, sculpturing, sketching, painting, etc.

More particularly, the device of the present invention comprises a shell-like simulated human head and integral downwardly open chest, a pair of flexible, transparent, inflatable simulated lungs disposed in the resulting chest cavity, the said lungs being connected by suitable conduit means to an opening in the mouth of the simulated human head, the whole being further characterized by a flexible resilient diaphragm extending across and closing the chest cavity, whereby to inflate and deflate the lungs thereby, or to provide means for resisting inflation and inducing exhaustion of the lungs when inflated.

The objects and advantages of the present invention and its arrangement of parts will be apparent from a consideration of the following specification and accompanying drawings wherein:

FIG. 1 is a front elevational view of the anatomical device of the present invention, and FIG. 2 is a side elevational view thereof.

FIG. 3 is a transverse section on line 3—3 of FIG. 1.

FIG. 4 is a rear perspective view of the heart component of the assembly of the previous figures.

FIG. 5 is a fragmentary detailed view on the line 5—5 of FIG. 2.

FIG. 6 is a vertical sectional view on the line 6—6 of FIG. 2.

FIG. 7 is a section on the line 7—7 of FIG. 1.

FIG. 8 is a fragmentary detailed view on the line 8—8 of FIG. 7.

FIG. 9 is a fragmentary detailed view on the line 9—9 of FIG. 8.

Referring to the drawings, the reference numeral 10 designates the front half, and the reference numeral 11 rear half of a transparent shell-like simulated human head and integral downwardly open chest or torso, the head having a mouth aperture 12 formed therein. The components 10 and 11 may be formed of transparent plastic material such as of polystyrene and is of rigid character.

The two sections 10 and 11 are adapted to be secured together as by adhesion on the line which substantially divides the sections 10 and 11 on a longitudinal plane. Disposed within the cavity provided by the units 10 and 11 there is a conduit generally indicated as 14 which likewise may be composed of two sections longitudinally divided on the line 15 and adhesively joined together. One end of this conduit 14 is relatively enlarged as at 16 and embraces the inward annular projection 17 which embraces the mouth aperture 12. The other or smaller downwardly extending end 18 of the conduit 14 projects within the chest cavity where it is engaged by the central or neck portion 19 of the lung unit 20. The lung unit 20 is composed of transparent or translucent flexible material such as polyethylene, and is disposed within the chest cavity.

By breathing into the mouth cavity 12 the lungs 20 may be inflated, and they may be deflated by exerting pressure against them.

Further in accordance with the present invention, the downwardly open base of the chest cavity is closed by the resilient flexible diaphragm 21 which may be of rubbery or rubber material and which has an annular bead 22 which seats in the external annular seat 23 of the lower periphery of the torso or chest cavity components 10 and 11. When the diaphragm 21 is in place, breathing into the mouth cavity 12 will inflate the lungs 20 and also exert pressure outwardly against the diaphragm 21 so that when one stops breathing into the cavity 12 or permits it to remain free the previously inflated lungs will become deflated by pressure of the diaphragm 21 against the air in the chest cavity, and thus exhaust the lungs 20, as for example a simulated artificial respiration. Thus, artificial respiration may be one of the things which may be taught by the device of the present invention.

The lungs 20 may also be caused to be inflated and deflated alternately by manipulation of the diaphragm 21 by grasping the protruding piece 24. Thus manipulation of the diaphragm 21 may demonstrate the effect of smoking. For example, by placing an unlit cigarette in the mouth cavity 12 of the unit and by holding a lighted match to the end of the cigarette the cigarette will light and continued working of the diaphragm will drive the smoke into the lungs. Eventually the lungs will become coated with nicotine showing the tars and impurities in the inhaled smoke.

The device of the present invention may thus be designated as a "transparent breathing man" and may be used for both educational and entertainment purposes.

For the purpose of giving the assembly greater fidelity, a simulated heart 25 may be interposed in the chest cavity by means of the pins 26, 26 engaged in the sockets 27, 27 in the inner wall of segment 11.

Means are also provided for supporting the anatomical device in upright position by means of a stand comprising a base 28 and an upright 29. The upright 29 comprises a pair of pins 30, 30 on the section 32 which enter the bayonet slots 31, 31 in the segment 11. The section 32 may then be sealed against the rear of the segment 11 so that the segments 10 and 11 are sealed at all points except at the aperture 12 which leads to the lungs 20.

Although I have shown and described a preferred embodiment of my invention, modifications will become apparent to those skilled in the art within the scope of the following appended claims.

I claim:
1. An anatomical device comprising a transparent shell-like simulated human head and integral downwardly open chest, a pair of flexible, transparent, inflatable simulated lungs disposed in the chest cavity, an aperture formed in the mouth of said head, a conduit leading from and connected to said mouth at one end and at its other to a tube disposed medially of said lungs, and a flexible resilient diaphragm extending across and closing said chest cavity.

2. An anatomical device comprising a transparent shell-like simulated human head and integral downwardly open chest, an elastic diaphragm extending across and closing said chest opening, a pair of flexible inflatable simulated lungs disposed in the resulting chest cavity, an aperture formed in the mouth of said head, and a conduit leading from said mouth aperture to said lungs disposed in said chest cavity whereby to inflate and deflate said lungs therethrough.

3. An anatomical device comprising a transparent shell-like simulated human head and integral downwardly open chest, a pair of flexible, transparent, inflatable simulated lungs disposed in the chest cavity, an aperture formed in the mouth of said head, a conduit leading from and connected to said mouth at one end and at its other to a tube disposed medially of said lungs, and a flexible resilient diaphragm extending across and closing said chest cavity, said diaphragm being alternately resiliently expandable to draw air into said lungs and collapsible to cause air to be expelled from said lungs.

4. An anatomical device comprising a transparent shell-like simulated human head and integral downwardly open chest, an elastic diaphragm extending across and closing said chest opening, a pair of flexible inflatable simulated lungs disposed in the resulting chest cavity, an aperture formed in the mouth of said head, and a conduit leading from said mouth aperture to said lungs disposed in said chest cavity whereby to inflate and deflate said lungs therethrough, means in engagement with the exterior of the back of said chest portion comprising a vertical support arm and an integral base for supporting said anatomical device in vertical disposition.

5. A kit for forming an anatomical device comprising a pair of transparent half-shell-like elements adapted to be secured together to form a simulated human head and torso having a downwardly open chest cavity, an elastic diaphragm adapted to be stretched across and to close said chest cavity, a pair of flexible inflatable simulated lungs adapted to be disposed in said chest cavity, a conduit adapted to be disposed in said chest cavity with one end closing an aperture formed in the mouth of said head and the other engaged to a tube disposed medially of said lungs.

References Cited by the Examiner
UNITED STATES PATENTS

| | | | |
|---|---|---|---|
| 2,143,458 | 6/1915 | Stern | 46—9 |
| 3,009,267 | 11/1961 | Bezark | 35—17 |
| 3,154,881 | 11/1964 | Elwell | 46—9 |
| 3,199,225 | 8/1965 | Robertson et al. | 35—17 |

EUGENE R. CAPOZIO, *Primary Examiner.*